US012706234B2

(12) United States Patent
Lee et al.

(10) Patent No.: US 12,706,234 B2
(45) Date of Patent: Aug. 11, 2026

(54) OVER-CURRENT PROTECTION DEVICE

(71) Applicant: Polytronics Technology Corp., Hsinchu (TW)

(72) Inventors: Chia-Yuan Lee, Hsinchu City (TW); Hsiu-Che Yen, Taoyuan City (TW); Yung-Hsien Chang, Douliu City (TW); Cheng-Yu Tung, Tainan City (TW); Chen-Nan Liu, Pitou Township (TW); Chingting Chiu, Taoyuan City (TW); Yao-Te Chang, Linnei Township (TW); Fu-Hua Chu, Taipei City (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 456 days.

(21) Appl. No.: 18/466,205

(22) Filed: Sep. 13, 2023

(65) Prior Publication Data

US 2024/0387079 A1 Nov. 21, 2024

(30) Foreign Application Priority Data

May 16, 2023 (TW) ................................ 112118000

(51) Int. Cl.
*H01C 7/02* (2006.01)

(52) U.S. Cl.
CPC ..................................... *H01C 7/02* (2013.01)

(58) Field of Classification Search
CPC .......... H01C 7/02; H01C 7/008; H01C 7/027; H01C 17/0652; H01C 17/06586
See application file for complete search history.

(56) References Cited

U.S. PATENT DOCUMENTS

| | | | | |
|---|---|---|---|---|
| 7,286,038 B1 * | 10/2007 | Wang | H01C 7/021 252/512 |
| 11,574,750 B2 * | 2/2023 | Yen | H01C 7/02 |
| 2007/0057759 A1 * | 3/2007 | Koyama | H01C 1/1406 338/22 R |
| 2023/0343494 A1 * | 10/2023 | Zhou | H01C 7/028 |

FOREIGN PATENT DOCUMENTS

| | | | |
|---|---|---|---|
| EP | 2494562 B1 * | 5/2018 | H01C 17/06586 |
| TW | 201913696 A | 4/2019 | |
| TW | 202109556 A | 3/2021 | |

* cited by examiner

*Primary Examiner* — Kyung S Lee
(74) *Attorney, Agent, or Firm* — MUNCY, GEISSLER, OLDS & LOWE, P.C.

(57) ABSTRACT

An over-current protection device includes an electrode layer and a heat-sensitive layer. The heat-sensitive layer contacts a top metal layer and a bottom metal layer of the electrode layer, and is laminated therebetween. In addition, the heat-sensitive layer exhibits a positive temperature coefficient (PTC) characteristic and includes a polymer matrix and a conductive filler. The polymer matrix includes a first fluoropolymer, by which the over-current protection device has a starting jump temperature of resistance ranging from 184° C. to 192° C. The conductive filler includes carbon black and a metal compound, thereby forming an electrically conductive path in the heat-sensitive layer.

19 Claims, 3 Drawing Sheets

OVER-CURRENT PROTECTION DEVICE

BACKGROUND OF THE INVENTION

(1) Field of the Invention

The present application relates to an over-current protection device, and more specifically, to an over-current protection device having a high activating temperature and low electrical resistivity.

(2) Description of the Related Art

Because the electrical resistance of conductive composite materials having a positive temperature coefficient (PTC) characteristic is very sensitive to temperature variation, they can be used as the materials for current sensing devices and have been widely applied to over-current protection devices or circuit devices. More specifically, the electrical resistance of the PTC conductive composite material remains extremely low at normal temperatures, so that the circuit or battery cell can operate normally. However, when an over-current or an over-temperature situation occurs in the circuit or cell, the electrical resistance will instantaneously increase to a high electrical resistance state (e.g., at least above $10^4\Omega$), which is the so-called "trip". Therefore, the over-current will be eliminated so as to protect the cell or the circuit device.

The basic structure of the over-current protection device consists of a PTC material layer with two electrodes bonded to two opposite sides of the PTC material layer. The PTC material layer includes a matrix and a conductive filler. The matrix consists of at least one polymer, and the first conductive filler is uniformly dispersed in the matrix and is used as an electrically conductive path. Moreover, the polymer may have a low activating temperature or a high activating temperature depending on the type of polymer used in the matrix. The activating temperature may be referred to as "starting jump temperature of resistance", and it is a temperature point where the electrical resistance starts to significantly increase (or more specifically, starts to increase from about $10^{-1}\ \Omega$~$10^1\Omega$). High-density polyethylene is often used as a polymer with low activating temperature, and polyvinylidene difluoride is often used as a polymer with high activating temperature. However, the activating temperatures of high-density polyethylene and polyvinylidene difluoride are about 120° C. and 160° C., respectively, both of which do not meet the requirement for higher protection temperature in the automotive industry. More specifically, the electronic module in a car includes several electronic components, and the normal operating temperature of these electronic components may be up to 150° C.~160° C. If the activating temperature of the over-current protection device is lower than or around 160° C., the current in the over-current protection device becomes smaller or is totally cut off in the car, and the electronic components may be turned off under their normal operating temperature.

Accordingly, there is a need to improve the activating temperature and thermal stability of the over-current protection device.

SUMMARY OF THE INVENTION

The present invention provides an over-current protection device, which is endurable in high temperature and suitable to be used as a protection device in the automotive industry. The over-current protection device has a heat-sensitive layer exhibiting a positive temperature coefficient (PTC) characteristic, and the heat-sensitive layer has a polymer matrix and a low-resistivity conductive filler (i.e., combination of carbon black and metal compound). It is noted that the polymer matrix of the present invention includes a fluoropolymer as its major constituent. The fluoropolymer has a higher starting jump temperature of resistance, and therefore the initial temperature point where the electrical resistance starts to significantly increase is higher. The fluoropolymer is added in proper proportion, and adjusts the starting jump temperature of resistance of the device to a specified temperature ranging from about 184° C. to 192° C. That is, the electrical resistance of the over-current protection device starts to significantly increase at a temperature point ranging from about 184° C. to 192° C., and reaches to the maximum at another temperature point (higher than about 208° C.) above the aforementioned range.

In accordance with an aspect of the present invention, an over-current protection device includes an electrode layer and a heat-sensitive layer. The electrode layer has a top metal layer and a bottom metal layer. The heat-sensitive layer contacts the top metal layer and the bottom metal layer, and is laminated therebetween. The heat-sensitive layer exhibits a positive temperature coefficient (PTC) characteristic, and includes a polymer matrix and a conductive filler. The polymer matrix includes a first fluoropolymer, by which the over-current protection device has a starting jump temperature of resistance ranging from 184° C. to 192° C. The conductive filler includes carbon black and a metal compound, and is dispersed in the polymer matrix, thereby forming an electrically conductive path in the heat-sensitive layer.

In an embodiment, the polymer matrix does not include polyvinylidene difluoride, and the over-current protection device has a resistance-peak temperature over 208° C.

In an embodiment, the first fluoropolymer has a melting point lower than 240° C.

In an embodiment, the first fluoropolymer is ethylene-tetrafluoroethylene copolymer, and the over-current protection device has a resistance-peak temperature over 208° C.

In an embodiment, the total volume of the heat-sensitive layer is calculated as 100%, and the ethylene-tetrafluoroethylene copolymer accounts for 42% to 49%.

In an embodiment, the total volume of the heat-sensitive layer is calculated as 100%, and the metal compound accounts for 33% to 40%.

In an embodiment, the polymer matrix further includes a second fluoropolymer selected from the group consisting of polytetrafluoroethylene, tetrafluoroethylene-hexafluoropropylene copolymer, perfluoroalkoxy modified tetrafluoroethylenes, vinylidene fluoride-tetrafluoroethylene copolymer, tetrafluoroethylene-perfluorodioxole copolymer, vinylidene fluoride-hexafluoropropylene copolymer, and vinylidene fluoride-hexafluoropropylene-tetrafluoroethylene terpolymer, and mixture or copolymer of combinations thereof. The total volume of the heat-sensitive layer is calculated as 100%, and the second fluoropolymer accounts for 4% to 6%.

In an embodiment, the polymer matrix does not include poly(chlorotri-fluorotetrafluoroethylene).

In an embodiment, the second fluoropolymer is polytetrafluoroethylene.

In an embodiment, the first fluoropolymer has a melt flow index ranging from 20 g/10 min to 30 g/10 min at 297° C.

In an embodiment, the over-current protection device has a peak resistance equal to or higher than $1\times10^7\Omega$ after trip.

In an embodiment, the peak resistance ranges from $1\times10^7\Omega$ to $3\times10^7\Omega$.

In an embodiment, the over-current protection device has an electrical resistivity ranging from 0.02 Ω·cm to 0.09 Ω·cm when cooled back to room temperature after a first trip event.

In an embodiment, the over-current protection device has a resistance-jump ratio ranging from 2.1 to 2.5 in a first cycle life test. The first cycle life test includes applying a power to the over-current protection device for a specified number of cycles, wherein the power is 24V/40 A and the specified number of cycles is 200. The resistance-jump ratio is obtained by dividing a post-trip resistance by an initial electrical resistance, wherein the over-current protection device has the initial electrical resistance at room temperature before any trip event, and the over-current protection device has the post-trip resistance when cooled back to room temperature after the first cycle life test.

In an embodiment, the resistance-jump ratio ranges from 2.4 to 2.5.

In an embodiment, the over-current protection device is not burnt out after a second cycle life test. The second cycle life test includes applying a power to the over-current protection device for a specified number of cycles, wherein the power is 24V/40 A and the specified number of cycles is 500.

In an embodiment, the over-current protection device is not burnt out after a third cycle life test. The third cycle life test includes applying a power to the over-current protection device for a specified number of cycles, wherein the power is 30V/30 A and the specified number of cycles is 100.

In an embodiment, the over-current protection device has a first thermal derating ratio ranging from 0.51 to 0.66. The first thermal derating ratio is obtained by dividing a required trip current of the over-current protection device under 23° C. by a required trip current of the over-current protection device under −40° C.

In an embodiment, the over-current protection device has a second thermal derating ratio ranging from 0.63 to 0.73, wherein the second thermal derating ratio is obtained by dividing a required trip current of the over-current protection device under 125° C. by a required trip current of the over-current protection device under 85° C.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
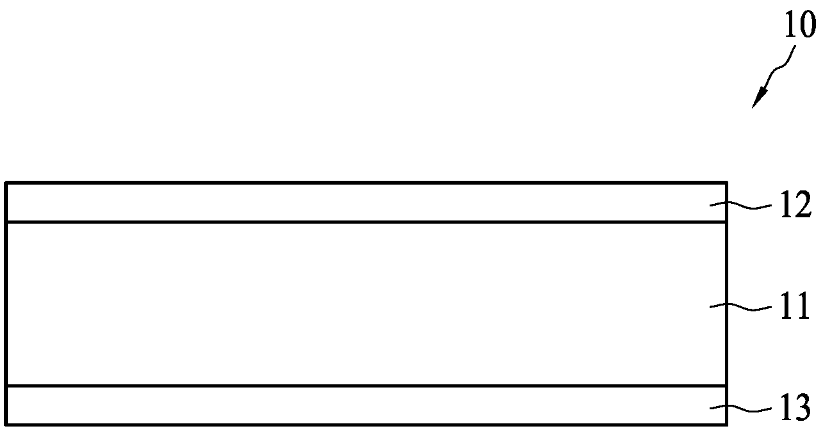
FIG. 1 shows a cross-sectional view of an over-current protection device in accordance with an embodiment of the present invention.

Please refer to FIG. 1. FIG. 1 shows one basic aspect of an over-current protection device 10 of the present invention in cross-sectional view. The over-current protection device 10 includes a heat-sensitive layer 11 and an electrode layer. The heat-sensitive layer 11 has a top surface and a bottom surface, and the electrode layer has a top metal layer 12 and a bottom metal layer 13 attached to the top surface and the bottom surface, respectively. Therefore, the heat-sensitive layer 11 physically contacts the top metal layer 12 and the bottom metal layer 13, and is laminated therebetween. In an embodiment, the top metal layer 12 and the bottom metal layer 13 may be composed of the nickel-plated copper foils or other conductive metals. In addition, the heat-sensitive layer 11 includes a polymer matrix and a conductive filler. The polymer matrix is an electrical insulator sensitive to heat, and the conductive filler is a conductor, by which the heat-sensitive layer 11 exhibits PTC characteristic. The over-current protection device 10 does not operate under normal condition, and therefore the conductive filler is uniformly dispersed in the polymer matrix, and particles of the conductive filler connect to each other in series, thereby forming an electrically conductive path; however, the polymer matrix rapidly expands when the over-current protection device 10 is subject to high temperature, and the particles of the conductive filler are pulled away from each other, thereby cutting off the electrically conductive path in the heat-sensitive layer 11.

In other words, the PTC characteristic is substantially determined by the type of the polymer matrix and its proportion relative to the conductive filler. Accordingly, the polymer matrix of the present invention includes a specified fluoropolymer (referred to as “first fluoropolymer” hereinafter). The first fluoropolymer is added in proper proportion, and makes the starting jump temperature of resistance of the over-current protection device 10 range from 184° C. to 192° C. in a first temperature range. In the present invention, the starting jump temperature of resistance preferably ranges from 186° C. to 190° C. in consideration of reproducibility. The starting jump temperature of resistance is the initiation temperature that the electrical resistance starts to significantly increase. That is, the starting jump temperature is not the temperature where the electrical resistance of the over-current protection device 10 has reached its maximum, but is the starting point of temperature where the electrical resistance of the over-current protection device 10 begins to increase abruptly. As the temperature increases over 208° C., the over-current protection device 10 reaches to the high electrical resistance state (i.e., the state that the electrical resistance is above about $10^7\Omega$), and has a maximal electrical resistance in a second temperature range. The maximal electrical resistance is also referred to as “peak resistance”, and in the meantime, the temperature point corresponding to the peak resistance is referred to as “resistance-peak temperature” in the second temperature range. In the present invention, the peak resistance ranges from $1\times10^7\Omega$ to $3\times10^7\Omega$, and the resistance-peak temperature ranges from 208° C. to 218° C.

It is noted that during operation, the internal core temperature of a car may be up to 180° C., and generally, the electronic components can still properly function under 150° C. to 160° C. Therefore, the starting jump temperature of resistance of the over-current protection device 10 needs to be higher than the conventional one, and should be controlled under a limit value. For example, if the starting jump temperature of resistance is lower than 184° C., such initiation temperature for significantly increase in resistance is too close to the normal operating temperature of the electronic components in the car. It may raise the possibility to cut off the current too early (i.e., before the expected timing) by the over-current protection device 10. On the other hand, it is noted that before the temperature reaches the starting jump temperature of resistance, the electrical resistance of the over-current protection device 10 has gradually increased. Even if the current is not totally cut off, the normal function of the electronic components in the car is still compromised as long as the starting jump temperature of resistance approaches the temperature range of 150° C. to 160° C. (i.e., below 184° C.).

If the starting jump temperature of resistance is higher than 192° C., the solder melting issue arises. More specifically, the over-current protection device 10 is assembled on the circuit board (or other supportive substrates) by solder, and the melting point of solder is generally lower than 260° C. In addition, the solder is softened at around 230° C., and phase transition of it occurs at the same temperature. If the starting jump temperature of resistance of the over-current protection device 10 is too close to 230° C., the timing of cutting off the current is too late to prevent the excessive increase in temperature. The increased temperature may be sufficient to soften or even melt the solder, which makes the over-current protection device 10 detached from the circuit board (or other supportive substrates).

In addition, considering the requirement of higher protection temperature in the automotive industry, the present invention does not include polyvinylidene difluoride, which has a low melting point at around 177° C., in the polymer matrix. As for the first fluoropolymer in the polymer matrix of the present invention, it may be ethylene-tetrafluoroethylene copolymer having a melting point lower than 240° C. It is understood that ethylene-tetrafluoroethylene copolymer may have different melting points based on different polymerization methods, and the melting point may be relatively high (above 280° C.) or low (below 240° C.). In the present invention, ethylene-tetrafluoroethylene copolymer has the low melting point. Besides the starting jump temperature of resistance as described above, the issue of processability is also taken into consideration. Ethylene-tetrafluoroethylene copolymer having low melting point facilitates the blending processability when the polymer matrix is mixed with the conductive filler. If the melting point of ethylene-tetrafluoroethylene copolymer is higher than 240° C., the structure of the blending mixture between the polymer matrix and the conductive filler is too stable under high temperature. Because the stability is unfavorably high, the blending mixture is difficult to be processed during hot pressing. In an embodiment, the melting point of ethylene-tetrafluoroethylene copolymer preferably ranges from 220° C. to 230° C.; and in accordance with the standard of ASTM D3159, ethylene-tetrafluoroethylene copolymer has a melt flow index ranging from 20 g/10 min to 30 g/10 min at 297° C. The melt flow index is also referred to as "melt flow rate", which is defined as the weight of a polymer in unit of gram flowing in 10 minutes through a capillary, and can be used to assess the flowability of the polymer in the melted state. The higher the melt flow index is, the better the flowability will be. Conversely, the lower the melt flow index is, the poorer the flowability will be. Generally, if the melting point of ethylene-tetrafluoroethylene copolymer is higher than 240° C., its melt flow index is lower than 20 g/10 min and thus the flowability is poor during hot pressing.

The heat-sensitive layer 11 of the present invention may further include another fluoropolymer (referred to as "second fluoropolymer" hereinafter) in the polymer matrix.

The conductive filler is dispersed in the polymer matrix consisting of the first fluoropolymer and the second fluoropolymer, thereby forming the electrically conductive path in the heat-sensitive layer 11. The second fluoropolymer is selected from the group consisting of polytetrafluoroethylene, tetrafluoroethylene-hexafluoro-propylene copolymer, perfluoroalkoxy modified tetrafluoroethylenes, vinylidene fluoride-tetrafluoroethylene copolymer, tetrafluoroethylene-perfluorodioxole copolymer, vinylidene fluoride-hexafluoropropylene copolymer, and vinylidene fluoride-hexafluoropropylene-tetrafluoroethylene terpolymer, and mixture or copolymer of combinations thereof. For example, the second fluoropolymer may be polytetrafluoroethylene. Accordingly, ethylene-tetrafluoroethylene copolymer may be selected as the first fluoropolymer and the major constituent of the polymer matrix, and polytetrafluoroethylene may be selected as the second fluoropolymer and the minor constituent of the polymer matrix. That is, in the polymer matrix, the amount of ethylene-tetrafluoroethylene copolymer is higher than the amount of polytetrafluoroethylene; and the total volume of the heat-sensitive layer 11 is calculated as 100%, and ethylene-tetrafluoroethylene copolymer accounts for 42% to 49% and polytetrafluoroethylene accounts for 4% to 6%. In an embodiment, the total volume of the heat-sensitive layer 11 is calculated as 100%, ethylene-tetrafluoroethylene copolymer accounts for 42%, 43%, 44%, 45%, 46%, 47%, 48%, or 49%. In an embodiment, the total volume of the heat-sensitive layer 11 is calculated as 100%, polytetrafluoroethylene accounts for 4%, 4.5%, 5%, 5.5%, or 6%. The melting point of polytetrafluoroethylene (about 320° C. to 335° C.) is much higher than ethylene-tetrafluoroethylene copolymer. Considering the requirement of the automotive industry, the amount of polytetrafluoroethylene is precisely controlled, and therefore the polymer matrix would not include excessive polytetrafluoroethylene according to the above proportion range. In this way, the starting jump temperature of resistance of the over-current protection device 10 is not affected, while the thermal stability of the polymer matrix can be improved. Moreover, the present invention does not include poly(chlorotri-fluorotetrafluoroethylene) as its second fluoropolymer in consideration of the blending process. In other words, the polymer matrix does not include poly(chlorotri-fluorotetrafluoroethylene). When poly(chlorotri-fluorotetrafluoroethylene) is blended with other materials (e.g., ethylene-tetrafluoroethylene copolymer and other fillers), the blending mixture may be fragile, prone to be degraded, or produce polluted gases. Therefore, poly(chlorotri-fluorotetrafluoroethylene) is not suitable to be used in the present invention.

As for the conductive filler, a metal compound is used as the major constituent, and carbon black is used as the minor constituent in order to increase the electrical conductivity in the over-current protection device 10 of the present invention. The conductive filler includes carbon black and the metal compound, and is dispersed in the polymer matrix, thereby forming the electrically conductive path in the heat-sensitive layer 11. The total volume of the heat-sensitive layer 11 is calculated as 100%, and the metal compound accounts for 33% to 40%. The metal compound is selected from the group consisting of tungsten carbide, titanium carbide, vanadium carbide, zirconium carbide, niobium carbide, tantalum carbide, molybdenum carbide, hafnium carbide, titanium boride, vanadium boride, zirconium boride, niobium boride, molybdenum boride, hafnium boride, zirconium nitride, and any combination thereof. In an embodiment, the over-current protection device 10 may include a small amount of carbon black in order to improve the voltage endurance capability. For example, the total volume of the heat-sensitive layer 11 is calculated as 100%, and carbon black accounts for 2% to 8%. In a preferred embodiment, the present invention finds that the combination of a metal carbide (especially tungsten carbide) and carbon black may provide the over-current protection device 10 with low electrical resistivity and better voltage endurance capability.

As described above, the over-current protection device 10 in FIG. 1 is the basic aspect of the present disclosure, and thus it may be further processed depending on the requirements. The additional processes often involve high temperature which triggers the trip event of the over-current protection device 10. The electrical resistance of the tripped over-current protection device 10 increases and is difficult to recover back to its original state even if it is cooled back to room temperature. The better the stability of electrical resistance is, the better the electrical resistance recovery capability of the over-current protection device 10 will be. If the over-current protection device 10 has better stability of electrical resistance, its electrical resistance tends to recover to a lower level in response to the decreasing temperature. Besides the control of the starting jump temperature of resistance, the present invention having the heat-sensitive layer 11 also improves the stability of electrical resistance of the over-current protection device 10. For example, the over-current protection device 10 may be welded with lead wires on its the top metal layer 12 and the bottom metal layer 13, respectively, and the welding temperature is high enough to trigger a first trip event. In the present invention, the over-current protection device 10 has an electrical resistivity ranging from 0.02 Ω·cm to 0.09 Ω·cm when cooled back to room temperature after the first trip event, and it is much lower than the electrical resistivity of the conventional over-current protection device (about 0.2 Ω·cm to 0.4 Ω·cm). Obviously, after processing, the over-current protection device 10 of the present invention may still have a good electrical conductivity under the un-tripped state, and thus do not affect the normal operation of other electronic components. In an embodiment, the over-current protection device 10 preferably has the electrical resistivity ranging from 0.02 Ω·cm to 0.06 Ω·cm, such as 0.0297 Ω·cm to 0.0535 Ω·cm.

In addition, the over-current protection device 10 of the present invention may include other electrical characteristics. Three different cycle life tests and two different thermal derating tests are described hereinafter. The cycle life tests may be referred to as first cycle life test, second cycle life test, and third cycle life test depending on their different test conditions. The thermal derating tests may be referred to as first thermal derating test and second thermal derating test depending on their different test conditions.

In the first cycle life test, the over-current protection device 10 has a resistance-jump ratio ranging from 2.1 to 2.5. More specifically, one cycle of the first cycle life test includes applying voltage/current at 24V/40 A for 10 seconds and turning it off for 60 seconds (i.e., on: 10 seconds; off: 60 seconds), and 200 cycles above are performed on the over-current protection device 10. The resistance-jump ratio is defined as a value by dividing a post-trip resistance of the over-current protection device 10 by an initial electrical resistance of the over-current protection device 10. The over-current protection device 10 has the initial electrical resistance at room temperature before any trip event, and has the post-trip resistance when cooled back to room temperature after the first cycle life test. The resistance-jump ratio can be an index for assessing the stability of electrical resistance of the over-current protection device. In all the embodiments of the present invention, the resistance-jump ratio can be stably maintained in the range from 2.1 to 2.5. In contrast, the conventional over-current protection device may not pass the first cycle life test because of its poor voltage endurance. Even if the conventional over-current protection device passes the first cycle life test, its electrical resistivity is too high to meet the requirements of industry. In an embodiment, the resistance-jump ratio of the over-current protection device 10 preferably ranges from 2.4 to 2.5.

In the second cycle life test, the over-current protection device 10 of the present invention has excellent voltage endurance capability, and is not burnt out under high applied voltage. The difference between the second cycle life test and the first cycle life test lies in the cycle number only. 500 cycles are performed in the second cycle life test. It is tested whether the over-current protection device 10 can endure more cycles of high energy shock. Although the conventional over-current protection device for low temperature overheating protection can pass the second cycle life test, the modified version of it (e.g., replacing the original major constituent with PVDF in the polymer matrix) cannot pass the second cycle life test to meet the requirement of high temperature overheating protection.

In the third cycle life test, the over-current protection device 10 of the present invention also has excellent voltage endurance capability, and is not burnt out under high applied voltage. The applied voltage and cycle number in the third cycle life test are different from that in the first and second cycle life test, and therefore the performance of the over-current protection device 10 can be further verified. More specifically, one cycle of the third cycle life test includes applying voltage/current at 30V/30 A for 10 seconds and turning it off for 60 seconds (i.e., on: 10 seconds; off: 60 seconds), and 100 cycles above are performed on the over-current protection device 10. Under such applied power and cycle number, the over-current protection device 10 of the present invention still functions normally without burnout. In contrast, it is likely that the conventional device for high temperature overheating protection may not pass the third cycle life test; and even if it can pass the third cycle life test, its electrical resistivity would be too high to meet the requirement of the industry.

The thermal derating test is used to compare different required trip currents under different environmental temperatures, thereby observing the effect of high temperature on device operation. Ideally, the user would expect the same (or similar) value of the required trip currents of the over-current protection device 10 under different environmental temperatures so that the over-current protection device 10 can perform its function of over-current protection at a stable preset current (i.e., the preset required trip current), which is beneficial to operational convenience. The test temperatures in the first thermal derating test are 23° C. and −40° C., and the test temperatures in the second thermal derating test are 125° C. and 85° C.

In the first thermal derating test, the over-current protection device 10 has a first thermal derating ratio ranging from 0.51 to 0.66. The first thermal derating ratio is defined as a value by dividing a required trip current of the over-current protection device under 23° C. by a required trip current of the over-current protection device under −40° C. In the second thermal derating test, the over-current protection device 10 has a second thermal derating ratio ranging from 0.63 to 0.73. The second thermal derating ratio is defined as a value by dividing a required trip current of the over-current protection device under 125° C. by a required trip current of the over-current protection device under 85° C. From the above, the first thermal derating test demonstrates thermal derating at a low temperature range (23° C. to −40° C.), and the second thermal derating test demonstrates thermal derating at a high temperature range (85° C. to 125° C.). In the low temperature range, the over-current protection device 10 of the present invention is not far different from the conventional over-current protection device; however, in the high temperature range, the second thermal derating ratio of the over-current protection device 10 is significantly higher than that of the conventional over-current protection device. The second thermal derating ratio of the over-current protection device 10 may be up to 0.73, but the second thermal derating ratio of the conventional over-current protection device is lower than about 0.55. Therefore, the thermal stability of the over-current protection device 10 is greatly improved when compared to the conventional device, and operation of the over-current protection device 10 of the present invention is less affected by high temperature.

Figure 2:
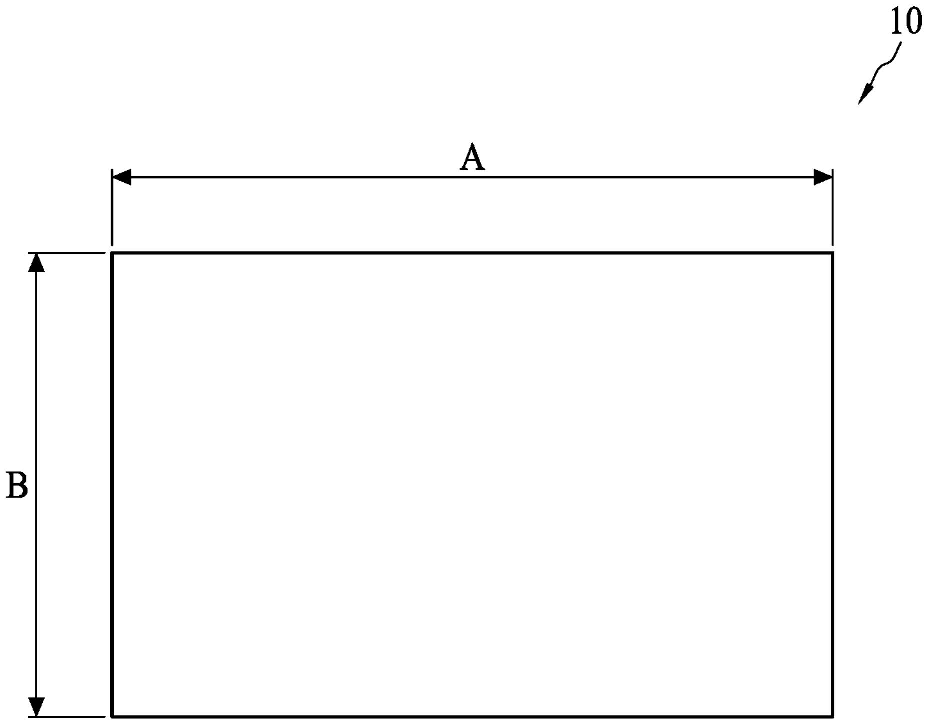
FIG. 2 shows the top view of the over-current protection device shown in FIG. 1.

Please refer to FIG. 2, which shows the top view of the over-current protection device 10 in FIG. 1. The over-current protection device 10 has a length A and a width B, and the top-view area "A×B" of the over-current protection device 10 is substantially equivalent to the top-view area of the heat-sensitive layer 11. The heat-sensitive layer 11 may have a top-view area ranging from 4 $mm^2$ to 72 $mm^2$ based on different products having different sizes. For example, the top-view area "A×B" may be 2×2 $mm^2$, 5×5 $mm^2$, 5.1×6.1 $mm^2$, 5×7 $mm^2$, 7.62×7.62 $mm^2$, 8.2×7.15 $mm^2$, 7.3×9.5 $mm^2$, 7.62×9.35 $mm^2$. In addition, the total thickness of the over-current protection device 10 (i.e., the total thickness of the top metal layer 12, the heat-sensitive layer 11, and the bottom metal layer 13) ranges from 0.5 mm to 0.6 mm. In an embodiment, the top-view area of the over-current protection device 10 is 35 $mm^2$ (i.e., 5×7 $mm^2$), and the thickness of it is 0.55 mm. In another embodiment, the top-view area of the over-current protection device 10 is 25 $mm^2$ (i.e., 5×5 $mm^2$), and the thickness of it is 0.5 mm. It is understood that the present invention can apply to any size of the over-current protection device 10 described above to achieve the same technical effect.

As described above, the present invention improves the electrical resistance characteristics of the over-current protection device 10 under high temperature. It could be verified according to the experimental data in Table 1 to Table 6 as shown below.

TABLE 1

| Major polymers of the polymer matrix | | |
|---|---|---|
| Polymer | Melt flow index (g/10 min) | Melting point(° C.) |
| ETFE | 25 | 225 |
| PVDF-1 | 3 | 168 |
| PVDF-2 | 1.1 | 185 |
| HDPE | 1 | 134 |

TABLE 2

| Volume percentage (vol %) of the heat-sensitive layer. | | | | | | | | |
|---|---|---|---|---|---|---|---|---|
| Group | ETFE | PVDF-1 | PVDF-2 | HDPE | PTFE | $Mg(OH)_2$ | CB | WC |
| E1 | 45 | | | | 5 | 5 | 8 | 33 |
| E2 | 48 | | | | 5 | 6 | 7 | 34 |
| E3 | 46 | | | | 5 | 8 | 5 | 36 |
| E4 | 43 | | | | 5 | 10 | 2 | 40 |
| C1 | | 43 | | | 5 | 10 | 2 | 40 |
| C2 | | | 43 | | 5 | 10 | 2 | 40 |
| C3 | | | | 56 | | | 5 | 40 |

Table 1 shows the major polymers, which are ethylene-tetrafluoroethylene copolymer (ETFE), two kinds of polyvinylidene difluoride (PVDF), and high density polyethylene (HDPE), in the polymer matrix. Melt flow indices are measured in accordance with standards of ASTM. The melt flow index of ethylene-tetrafluoroethylene copolymer is measured in accordance with the standard of ASTM D3159, and the melt flow indices of polyvinylidene difluoride and high density polyethylene are measured in accordance with the standard of ASTM D1238. In addition, ETFE has the highest melting point as shown in Table 1. The shape and structure of ETFE are stable at a temperature above 185° C., and it has excellent flowability under high temperature, thereby causing no hindrance to the hot-pressing and blending processes.

Please refer to Table 2. Table 2 shows the composition to form the heat-sensitive layer 11 by volume percentages in accordance with the embodiments (E1-E4) of the present disclosure and the comparative examples (C1-C3). The first column in Table 1 shows test groups E1-C3 from top to bottom. The first row in Table 1 shows various materials used for the heat-sensitive layer 11 from left to right, that is, ethylene-tetrafluoroethylene copolymer (ETFE), polyvinylidene difluoride (PVDF-1 and PVDF-2), high density polyethylene (HDPE), polytetrafluoroethylene (PTFE), magnesium hydroxide ($Mg(OH)_2$), carbon black (CB), and tungsten carbide (WC). In addition, each group uses magnesium hydroxide as its flame retardant. In order to enhance electrical conduction, tungsten carbide is the major constituent and carbon black is the minor constituent of the conductive filler, and the combination of tungsten carbide and carbon black in such proportion may also be referred to as a type of LR (low resistivity) system's conductive fillers.

In the embodiments E1 to E4, the major constituent of the polymer matrix is ETFE, and the minor constituent of the polymer matrix is PTFE. The melting point of PTFE (about 330° C.) is much higher than that of ETFE, and therefore the proportion of PTFE should not be excessively high. Otherwise, the protection temperature (e.g., starting jump temperature of resistance and resistance-peak temperature) and other unexpected issues relating to trip event of the over-current protection device are significantly affected. The proportion of ETFE relative to PTFE needs to be carefully controlled. More specifically, the proportion between ETFE and PTFE is in the range from 89:11 to 91:9. That is, the total volume of ETFE and PTFE is calculated as 100%, and ETFE accounts for 89% to 91% and PTFE accounts for 9% to 11%. It is noted that the proportion of the polymer matrix (i.e., ETFE and PTFE) in the heat-sensitive layer 11 also needs to be controlled in a specific range. If the proportion of the polymer matrix in the heat-sensitive layer 11 is too low, the overcurrent cannot be properly cut off. If the proportion of the polymer matrix in the heat-sensitive layer 11 is too high, electrical conduction of the device is poor under room temperature. Therefore, the polymer matrix accounts for 48% to 53% by volume of the heat-sensitive layer 11. It is noted that considering the measurement error and according to the practical use, the amount of the polymer matrix may range from 45% to 55%, and the same technical effect can be achieved in the above range.

In the comparative examples C1 and C2, the major constituent of the polymer matrix is PVDF, and the minor constituent of the polymer matrix is PTFE. Conventionally, different kinds of PVDF are used to improve thermal stability of the over-current protection device, and thus two kinds of PVDF, which are often used in the industry, are tested as shown in Table 2. PVDF-1 of the comparative example C1 has a lower melting point and a higher melt flow index, and PVDF-2 of the comparative example C2 has a higher melting point and a lower melt flow index. The following tests would show that electrical characteristics of both comparative examples C1-C2 do not meet the requirement of the automotive industry. As for the comparative example C3, the polymer matrix of it is made of HDPE. It is known that the melting point of HDPE is low, and its trip temperature is much lower. Honestly, the device of the comparative example C3 is conventionally used for low temperature overheating protection, and it is included in the test to show that devices for low temperature overheating protection cannot be applied to the automotive industry.

The manufacturing process of the embodiments E1 to E4 and the comparative examples C1 to C3 is described below. According to the composition shown in Table 2, materials are formulated and put into HAAKE twin screw blender for blending. The blending temperature for the embodiments is 240° C., and the blending temperature for the comparative examples is 215° C. The time for pre-mixing is 3 minutes, and the blending time is 15 minutes. The conductive polymer after being blended is pressed into a sheet by a hot press machine at a high temperature (i.e., 250° C. for the embodiments and 210° C. for the comparative examples) and a pressure of 150 kg/cm$^2$. The sheet is then cut into pieces of about 20 cm×20 cm, and two nickel-plated copper foils are laminated to two sides of the sheet with the hot press machine at the high temperature (i.e., 250° C. for the embodiments and 210° C. for the comparative examples) and the pressure of 150 kg/cm$^2$, by which a three-layered structure is formed. Then, the sheet with the nickel-plated copper foils is punched into PTC chips, each of which is the over-current protection device. Each sample of the over-current protection device has the length of 5 mm and the width of 7 mm (i.e., top-view area is 35 mm$^2$), and the thickness thereof is 0.55 mm. Then, the PTC chips of the embodiments and comparative example are subjected to electron beam irradiation of 50 kGy (irradiation dose can be adjusted depending on the requirement). After irradiation, the following measurements are performed by taking fifteen PTC chips as samples to be tested for each of the groups.

It is noted that besides the physical properties of the polymer itself (e.g., melt flow index and melting point in Table 1), there are numerous factors that should be taken into consideration, such as the compatibility between one polymer and another polymer (e.g., ETFE and PTFE), and the compatibility between the polymer matrix and the fillers (e.g., Mg(OH) 2, CB, and WC). According to the physical properties and compatibilities described above, appropriate proportion between them should be adjusted to allow the electrical characteristics of the over-current protection device 10 to meet the application requirements. Table 3 to Table 6 further show the electrical characteristics of the over-current protection device 10, and the details are described below.

TABLE 3

Trip temperature and peak resistance

| Group | Starting jump temperature of resistance (° C.) | Resistance-peak temperature (° C.) | Peak resistance (Ω) |
|---|---|---|---|
| E1 | 188 | 212 | $1 \times 10^7$ |
| E2 | 188 | 212 | $1 \times 10^7$ |
| E3 | 188 | 212 | $3 \times 10^7$ |
| E4 | 188 | 212 | $2 \times 10^7$ |
| C1 | 150 | 160 | $3 \times 10^5$ |
| C2 | 168 | 174 | $1 \times 10^6$ |
| C3 | 124 | 130 | $1 \times 10^8$ |

Figure 3:
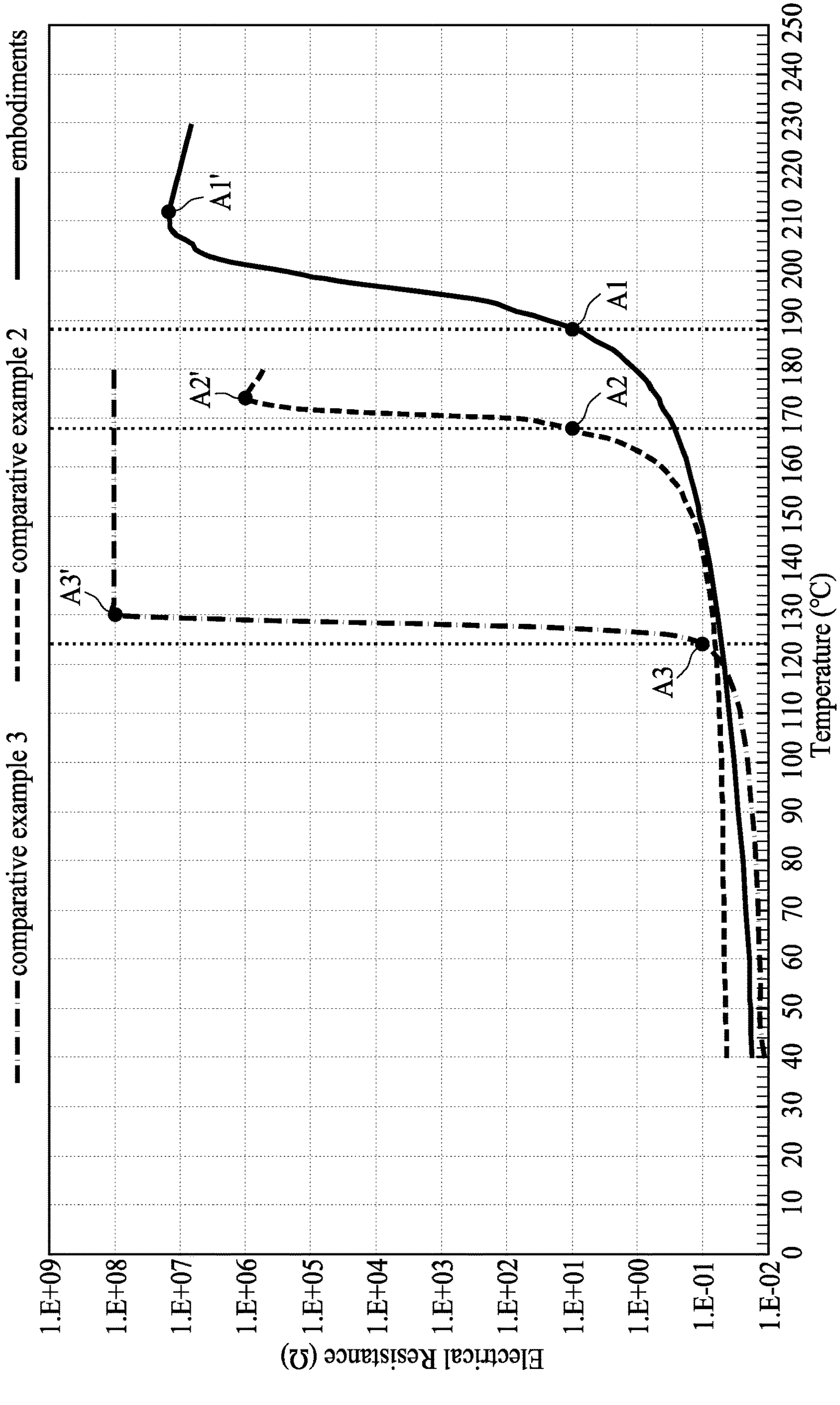
FIG. 3 and FIG. 4 show the resistance-temperature curves in accordance with the over-current protection device of the present invention.
Figure 4:
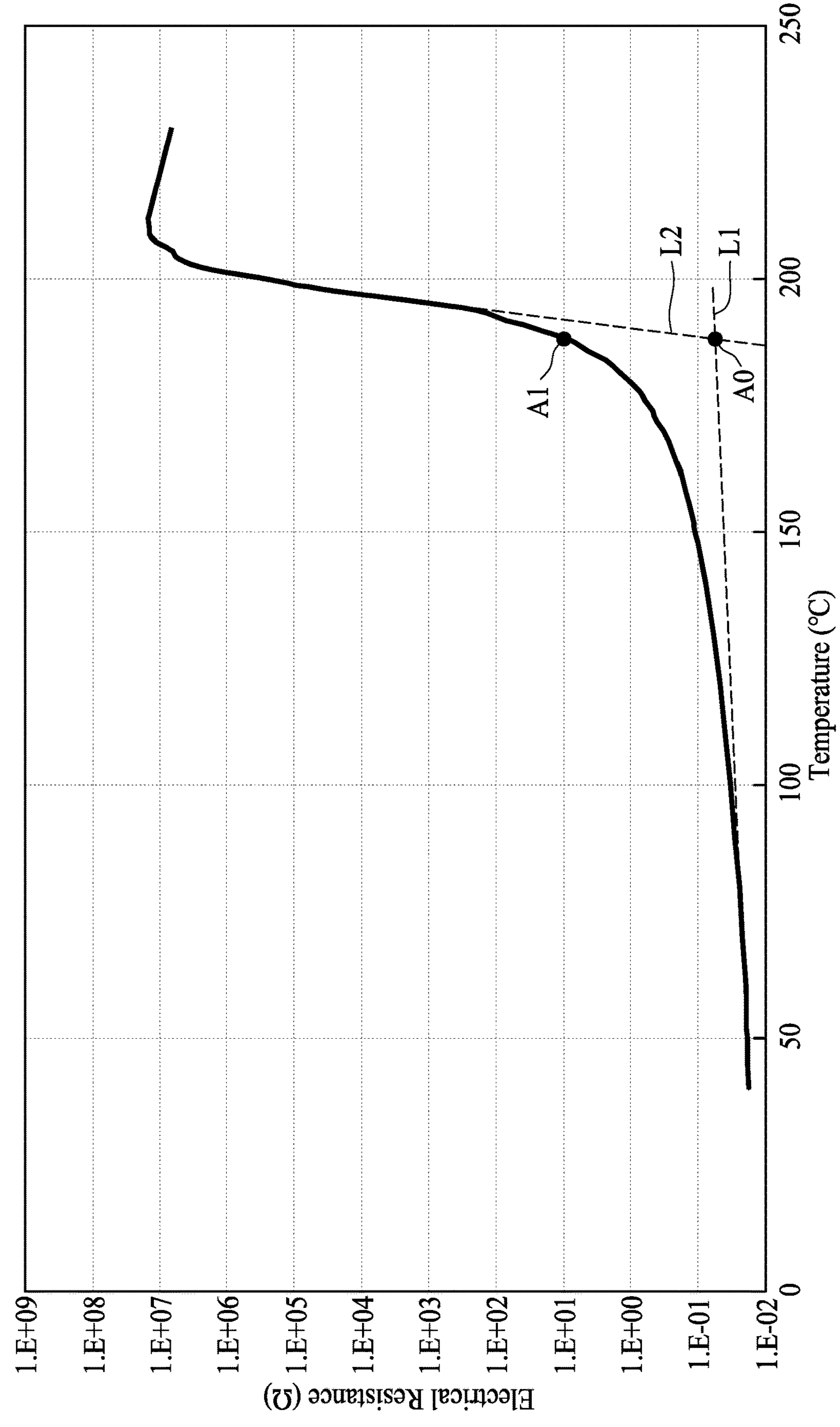

Please refer to Table 3, FIG. 3, and FIG. 4. FIG. 3 shows the resistance-temperature curves in accordance with the over-current protection device 10. The Y-axis shows the electrical resistance, and the X-axis shows the temperature. More specifically, a resistance-temperature (R-T) test is performed on the over-current protection device 10. R-T test is performed with a heating rate of 5° C./min, and the resistance-temperature curves of the over-current protection device 10 can be obtained. It is noted that the Y-axis in either FIG. 3 or FIG. 4 is based on logarithmic scale, and curves of the embodiments E1 to E4 are almost overlapped. Therefore, an average value of the data from the embodiments is calculated, and only one curve for all the embodiments E1 to E4 is illustrated in FIG. 3 for simplification purpose. In addition, the comparative examples C1 and C2 use the same major polymer (i.e., PVDF), and only the curve of the comparative example C2 is illustrated in FIG. 3 for simplification and ease of explanation. The point A1, point A2, and point A3 are the starting points where the electrical resistance starts to significantly increase, and may refer to as the starting points of resistance jump. The temperature point corresponding to the starting point of resistance jump is the starting jump temperature of resistance (° C.) in Table 3. The point A1', point A2', and point A3' are the highest points where the electrical resistance could reach, and may refer to as the highest points of resistance jump. The temperature point and electrical resistance corresponding to the highest point of resistance jump are the resistance-peak temperature (° C.) and peak resistance (Ω), respectively, in Table 3. In the embodiments E1 to E4, the starting jump temperature of resistance is 188° C., and the resistance-peak temperature is 212° C. Both the starting jump temperature of resistance and the resistance-peak temperature in all embodiments meet the requirement of the automotive industry. That is, the over-current protection device 10 of the embodiments E1-E4 does not turn on during the operable temperature range (about 150° C. to 160° C.) that the electronic components of the car can normally function. Then, the electrical resistance of the over-current protection device 10 of the embodiments E1-E4 can rise to the highest level (i.e., 1×10$^7$Ω to 3×10$^7$Ω of peak resistance) around 212° C. before the melting point of solder; and in this way, the overcurrent can be cut off without any solder melting issue described above. In contrast, the starting jump temperature of resistance in the comparative examples C1 and C2 ranges from about 150° C. to 168° C., and thus the over-current protection device would turn on during the operable temperature range that the electronic components of the car can normally function, thereby compromising the operation of the electronic components. Moreover, if an unexpected event occurs that raises the temperature up to 200° C. in a short time (i.e., the time being too short to allow the device to provide the protection), the over-current protection device of the comparative examples C1-C2 is prone to crack due to its poor thermal stability. As for the comparative example C3, the over-current protection device of it operates at relatively low temperature (124° C.), and compromises the normal operation of the electronic components of the car. Therefore, the over-current protection device of the comparative example C3 does not meet the requirement of the automotive industry.

Please refer to FIG. 4, which further shows the definition of the starting jump temperature of resistance of the embodiments E1-E4 in the present invention. Before the trip event, the over-current protection device 10 is in the low electrical resistance state, and the curve changes in approximately linear extension over a temperature range. In this way, a tangent line L1 can be illustrated according to the approximately linear extension. During the trip event, the over-current protection device 10 is in the high electrical resistance state, and the curve abruptly changes in approximately linear extension over another temperature range. Likewise, a tangent line L2 can be illustrated according to the approximately linear extension. The equation of the tangent line L1 is $y=0.002302x+0.005387$. The equation of the tangent line L2 is $y=9124x-1769929$. From the above, the slope of the tangent line L1 is 0.002302 (referred to as "lowest slope" hereinafter), and the slope of the tangent line L2 is 9124 (referred to as "highest slope" hereinafter). The tangent line L1 having the lowest slope intersects the tangent line L2 having the highest slope at the intersection point A0. The corresponding temperature on X-axis of the intersection point A0 is a switch point between the low electrical resistance state and the high electrical resistance state, that is, the starting jump temperature of resistance. The intersection point A0 overlaps the starting point of resistance jump A1 if it moves up along the direction parallel to Y-axis. Accordingly, the starting jump temperature of resistance can be precisely controlled in the range from 184° C. to 192° C. as long as the heat-sensitive layer 11 is formed of the composition according to the present invention.

Next, different cycle life tests are performed on the over-current protection device 10, and are used to assess the voltage endurance capability thereof. One cycle of the cycle life test includes applying a specified power for 10 seconds and turning it off for 60 seconds (i.e., on: 10 seconds; off: 60 seconds). In the following tests, there are three test conditions, and therefore three different cycle life tests (referred to as first cycle life test, second cycle life test, and third cycle life test hereinafter) are performed. The first cycle life test includes an applied power of 24V/40 A, and the cycle number thereof is 200; the second cycle life test includes an applied power of 24V/40 A, and the cycle number thereof is 500; and the third cycle life test includes an applied power of 30V/30 A, and the cycle number thereof is 100.

TABLE 4

| | Cycle life test | | | | | | |
|---|---|---|---|---|---|---|---|
| Group | $R_i$ (Ω) | $R_1$ (Ω) | ρ (Ω · cm) | $R_{200\ C}$ (Ω) | $R_{200\ C}/R_i$ | 500 C (24 V/40 A) | 100 C (30 V/30 A) |
| E1 | 0.0062 | 0.0084 | 0.0535 | 0.0206 | 2.456 | Pass | Pass |
| E2 | 0.0108 | 0.0138 | 0.0876 | 0.0327 | 2.375 | Fail | Fail |
| E3 | 0.0064 | 0.0087 | 0.0552 | 0.0214 | 2.466 | Fail | Fail |
| E4 | 0.0035 | 0.0047 | 0.0297 | 0.0103 | 2.199 | Fail | Fail |
| C1 | 0.0092 | 0.0585 | 0.3722 | — | — | Fail | Fail |
| C2 | 0.0053 | 0.0339 | 0.2154 | 0.0315 | 0.930 | Fail | Pass |
| C3 | 0.0035 | 0.0058 | 0.0369 | 0.018 | 3.103 | Pass | Pass |

In Table 4, the first row shows items to be tested from left to right.

"$R_i$" refers to initial electrical resistance of the over-current protection device at room temperature.

"$R_1$" refers to the electrical resistance in respect of the first time that the over-current protection device is tripped and cooled back to room temperature. More specifically, the lead wire may be further welded to the over-current protection device, and the welding temperature causes trip of device. Moreover, the electrical resistance formula is $\rho=R\times A/L$. "R" is electrical resistance, "L" is length (thickness), and "A" is cross sectional area. Accordingly, the electrical resistivity of ρ can be calculated corresponding to $R_1$.

"$R_{200}$" refers to the electrical resistance of the over-current protection device after the first cycle life test, the electrical resistance of which is then measured when cooled back to room temperature. Therefore, a resistance-jump ratio ($R_{200C}/R_i$) can be calculated. The smaller the value (i.e., the more it's close to 1) is, the better the resistance recovery capability of the over-current protection device will be. The over-current protection device with small resistance-jump ratio has better capability for electrical resistance recovery from trip of device toward the low electrical resistance. In other words, the resistance-jump ratio can be an index for assessing the stability of electrical resistance.

"500C" and "100C" show the device condition after the second cycle life test and the third cycle life test, respectively. "Pass" means that the over-current protection device is not burnt out, and "Fail" means that the over-current protection device is burnt out.

First, the attention is drawn to $R_i$ and its corresponding ρ. The over-current protection device 10 is the most basic type of the PTC device, and it often goes through several processes to meet the requirements of industry. That is, the over-current protection device 10 has often been tripped by at least one time before its practical use (i.e., being installed in the electronic apparatus to be protected). In other words, $R_1$ and p are closer to the actual situation of electrical resistance in practical use when the over-current protection device is installed in the electronic apparatus. In the embodiments E1 to E4, the over-current protection device 10 has the electrical resistance ($R_1$) ranging 0.0047Ω to 0.0138Ω and the electrical resistivity (φ ranging from 0.0297 Ω·cm to 0.0876 Ω·cm after the first trip event, both of which are much lower than $R_1$ and ρ of the comparative examples C1 and C2. That is, compared with the conventional device for high temperature overheating protection, the over-current protection device of the present invention has excellent electrical conductivity in the un-tripped state. As for the comparative example C3, it is designed for low temperature overheating protection and cannot be used in the apparatus requiring high temperature overheating protection as described above, although it has similar low electrical resistance ($R_1$) and electrical resistivity (φ.

Regarding the resistance-jump ratio ($R_{200C}/R_i$), the embodiments E1 to E4 stably maintains it in the range from 2.199 to 2.466. The device in the comparative example C1 is burnt out, and thus its resistance-jump ratio cannot be measured. Although the comparative example C2 has a lower resistance-jump ratio ($R_{200C}/R_i$), its electrical resistance ($R_1$) and electrical resistivity (ρ) at the beginning in the electronic apparatus are too high (i.e., 0.0339Ω and 0.2154 Ω·cm, respectively). In other words, the electrical conduction is poor, and hence the current flow is smaller during normal operation of the electronic apparatus. As for the comparative example C3, its resistance-jump ratio ($R_{200C}/R_i$) is 3.103, which is much higher than 2.199 to 2.466 of the embodiments E1 to E4. The over-current protection device of the comparative example C3 neither meets the requirement of high temperature overheating protection, nor has good resistance stability.

Using the same applied power as in the first cycle life test, the second cycle life test increases the cycles to test the limit of the cycle number that the over-current protection device 10 can withstand. The applied power in the first cycle life test is the same as the applied power in the second cycle life test, but the cycle number in the second cycle life test increases from 200 to 500. In the embodiments E1 to E4, only the embodiment E1 can withstand 500 cycles of the applied power and has the best voltage endurance capability, as shown in Table 4. The comparative examples C1 and C2 are both burnt out, which suggests that the conventional device for high temperature overheating protection has poor voltage endurance. Then, the third cycle life test is used to further test the limit of voltage and power that the over-current protection device 10 can withstand. Likewise, in the embodiments E1 to E4, only the embodiment E1 can pass the third cycle life test without burnout. Although the comparative example C2 can also pass the third cycle life test, it is burnt out in the second cycle life test and has poor electrical conductivity. The embodiment E1 is much better than the comparative example C2. It is noted that, again, the comparative example C3 is designed for low temperature overheating protection and cannot be applied to the automotive industry which requires high temperature overheating protection, although the device of the comparative example C3 passes the aforementioned three cycle life tests.

The last tests are thermal derating tests, which show the effect of temperature on trip characteristics of the over-current protection device 10, and can be used to assess the device's capability in minimizing the effect of thermal interference. The first thermal derating test demonstrates thermal derating at the low temperature range (23° C. to −40° C.), and the second thermal derating test demonstrates thermal derating at the high temperature range (85° C. to 125° C.). Details are described below.

TABLE 5

| First thermal derating test | | | | | |
|---|---|---|---|---|---|
| Group | $I\text{-}T_{-40°\,C.}$ (A) | $I\text{-}T_{-40°\,C.}$/area (A/mm²) | $I\text{-}T_{23°\,C.}$ (A) | $I\text{-}T_{23°\,C.}$/area (A/mm²) | $I\text{-}T_{23°\,C.}/I\text{-}T_{-40°\,C.}$ |
| E1 | 8.27 | 0.236 | 4.27 | 0.122 | 0.516 |
| E2 | 6.03 | 0.172 | 4.00 | 0.114 | 0.663 |
| E3 | 7.97 | 0.228 | 4.23 | 0.121 | 0.531 |
| E4 | 11.03 | 0.315 | 5.87 | 0.168 | 0.532 |
| C1 | 7.60 | 0.217 | 4.68 | 0.134 | 0.616 |
| C2 | 10.00 | 0.286 | 7.42 | 0.212 | 0.742 |
| C3 | 15.67 | 0.448 | 9.52 | 0.272 | 0.608 |

TABLE 6

| Second thermal derating test | | | | | |
|---|---|---|---|---|---|
| Group | $I\text{-}T_{85°\,C.}$ (A) | $I\text{-}T_{85°\,C.}$/area (A/mm²) | $I\text{-}T_{125°\,C.}$ (A) | $I\text{-}T_{125°\,C.}$/area (A/mm²) | $I\text{-}T_{125°\,C.}/I\text{-}T_{85°\,C.}$ |
| E1 | 2.23 | 0.064 | 1.57 | 0.04 | 0.704 |
| E2 | 2.07 | 0.059 | 1.40 | 0.04 | 0.676 |
| E3 | 2.37 | 0.068 | 1.50 | 0.04 | 0.633 |
| E4 | 3.45 | 0.099 | 2.50 | 0.07 | 0.725 |
| C1 | 2.08 | 0.059 | 0.40 | 0.01 | 0.192 |
| C2 | 4.39 | 0.125 | 2.43 | 0.07 | 0.554 |
| C3 | 3.47 | 0.099 | — | — | — |

As shown in Table 5, the first row shows items to be tested from left to right.

"$I\text{-}T_{-40°\,C.}$" refers to trip current of the over-current protection device under the environmental temperature of −40° C. Accordingly, "$I\text{-}T_{-40°\,C.}$/area" can be calculated, and it refers to trip current per unit area of the over-current protection device under the environmental temperature of −40° C.

"$I\text{-}T_{23°\,C.}$" refers to trip current of the over-current protection device under the environmental temperature of 23° C. Accordingly, "$I\text{-}T_{23°\,C.}$/area" can be calculated, and it refers to trip current per unit area of the over-current protection device under the environmental temperature of 23° C.

"$I\text{-}T_{23°\,C.}/I\text{-}T_{-40°\,C.}$" is used to compare different trip currents under different environmental temperatures, thereby observing the severity of thermal derating that the trip current decreases as the environmental temperature increases. "$I\text{-}T_{23°\,C.}/I\text{-}T_{-40°\,C.}$" may be referred to as the first thermal derating ratio. The more the value is close to 1, the less the trip current is affected by the temperature, and the higher the thermal stability will be.

In Table 6, $I\text{-}T_{85°\,C.}$, $I\text{-}T_{85°\,C.}$/area, $I\text{-}T_{125°\,C.}$, $I\text{-}T_{125°\,C.}$/area, and $I\text{-}T_{125°\,C.}/I\text{-}T_{85°\,C.}$ are defined in a similar way to the aforementioned $I\text{-}T_{-40°\,C.}$, $I\text{-}T_{-40°\,C.}$/area, $I\text{-}T_{23°\,C.}$, $I\text{-}T_{23°\,C.}$/area, and $I\text{-}T_{23°\,C.}/I\text{-}T_{-40°\,C.}$, and are not described in detail herein. In addition, "$I\text{-}T_{125°\,C.}/I\text{-}T_{85°\,C.}$" may be referred to as the second thermal derating ratio.

The attention is drawn to the first thermal derating ratio ($I\text{-}T_{23°\,C.}/I\text{-}T_{-40°\,C.}$) and the second thermal derating ratio ($I\text{-}T_{125°\,C.}/I\text{-}T_{85°\,C.}$). It is understood that if the over-current protection device is placed under high temperature, the electrical resistance of it is higher and the required trip current correspondingly decreases. However, it is unfavorable to the operational convenience if the required trip current is sensitive to the temperature and changes excessively under different temperatures. In other words, the less the decrease of trip current is, the better the thermal stability and operational convenience of electrical resistance will be.

In Table 5, the first thermal derating ratio ($I\text{-}T_{23^\circ C.}/I\text{-}T_{-40^\circ C.}$) of the embodiments E1 to E4 ranges from 0.516 to 0.663, and that of the comparative examples C1 to C3 is in the similar range. In Table 6, the second thermal derating ratio ($I\text{-}T_{125^\circ C.}/I\text{-}T_{85^\circ C.}$) of the embodiments E1 to E4 ranges from 0.633 to 0.725, which is much higher than that of the comparative examples C1 to C3. The device of the comparative example C3 has been activated (i.e., tripped) at 125° C., and therefore no data is shown in Table 6. From the above, the advantage of the embodiments E1 to E4 becomes apparent as the temperature increases to the high temperature range (85° C. to 125° C.), although the first thermal derating ratio of the embodiments E1 to E4 is similar to that of the comparative examples C1 to C3 at the low temperature range (23° C. to −40° C.). The second thermal derating ratio ($I\text{-}T_{125^\circ C.}/I\text{-}T_{85^\circ C.}$) of the embodiments E1 to E4 is in the range close to 1, and has excellent thermal stability.

The above-described embodiments of the present invention are intended to be illustrative only. Numerous alternative embodiments may be devised by persons skilled in the art without departing from the scope of the following claims.

What is claimed is:

1. An over-current protection device, comprising:

an electrode layer having a top metal layer and a bottom metal layer; and a heat-sensitive layer contacting the top metal layer and the bottom metal layer, and being laminated therebetween, wherein the heat-sensitive layer exhibits a positive temperature coefficient (PTC) characteristic and comprises:

a polymer matrix comprising a first fluoropolymer, whereby the over-current protection device has a starting jump temperature of resistance ranging from 184° C. to 192° C.; and a conductive filler comprising carbon black and a metal compound, and dispersed in the polymer matrix, thereby forming an electrically conductive path in the heat-sensitive layer.

2. The over-current protection device of claim 1, wherein the polymer matrix does not comprise polyvinylidene difluoride, and the over-current protection device has a resistance-peak temperature over 208° C.

3. The over-current protection device of claim 1, wherein the first fluoropolymer has a melting point lower than 240° C.

4. The over-current protection device of claim 1, wherein the first fluoropolymer is ethylene-tetrafluoroethylene copolymer, and the over-current protection device has a resistance-peak temperature over 208° C.

5. The over-current protection device of claim 1, wherein the total volume of the heat-sensitive layer is calculated as 100%, and the ethylene-tetrafluoroethylene copolymer accounts for 42% to 49%.

6. The over-current protection device of claim 1, wherein the total volume of the heat-sensitive layer is calculated as 100%, and the metal compound accounts for 33% to 40%.

7. The over-current protection device of claim 1, wherein the polymer matrix further comprises a second fluoropolymer selected from the group consisting of polytetrafluoroethylene, tetrafluoroethylene-hexafluoro-propylene copolymer, perfluoroalkoxy modified tetrafluoroethylenes, vinylidene fluoride-tetrafluoroethylene copolymer, tetrafluoroethylene-perfluorodioxole copolymer, vinylidene fluoride-hexafluoropropylene copolymer, and vinylidene fluoride-hexafluoropropylene-tetrafluoroethylene terpolymer, and mixture or copolymer of combinations thereof, wherein the total volume of the heat-sensitive layer is calculated as 100%, and the second fluoropolymer accounts for 4% to 6%.

8. The over-current protection device of claim 7, wherein the polymer matrix does not comprise poly(chlorotri-fluorotetrafluoroethylene).

9. The over-current protection device of claim 7, wherein the second fluoropolymer is polytetrafluoroethylene.

10. The over-current protection device of claim 1, wherein the first fluoropolymer has a melt flow index ranging from 20 g/10 min to 30 g/10 min at 297° C.

11. The over-current protection device of claim 1, wherein the over-current protection device has a peak resistance equal to or higher than $1\times10^7\Omega$ after trip.

12. The over-current protection device of claim 11, wherein the peak resistance ranges from $1\times10^7\Omega$ to $3\times10^7\Omega$.

13. The over-current protection device of claim 1, wherein the over-current protection device has an electrical resistivity ranging from 0.02 Ω·cm to 0.09 Ω·cm when cooled back to room temperature after a first trip event.

14. The over-current protection device of claim 1, wherein the over-current protection device has a resistance-jump ratio ranging from 2.1 to 2.5 in a first cycle life test, wherein:

the first cycle life test comprises applying a power to the over-current protection device for a specified number of cycles, wherein the power is 24V/40 A and the specified number of cycles is 200; and the resistance-jump ratio is obtained by dividing a post-trip resistance by an initial electrical resistance, wherein the over-current protection device has the initial electrical resistance at room temperature before any trip event, and the over-current protection device has the post-trip resistance when cooled back to room temperature after the first cycle life test.

15. The over-current protection device of claim 14, wherein the resistance-jump ratio ranges from 2.4 to 2.5.

16. The over-current protection device of claim 1, wherein the over-current protection device is not burnt out after a second cycle life test, wherein:

the second cycle life test comprises applying a power to the over-current protection device for a specified number of cycles, wherein the power is 24V/40 A and the specified number of cycles is 500.

17. The over-current protection device of claim 1, wherein the over-current protection device is not burnt out after a third cycle life test, wherein:

the third cycle life test comprises applying a power to the over-current protection device for a specified number of cycles, wherein the power is 30V/30 A and the specified number of cycles is 100.

18. The over-current protection device of claim 1, wherein the over-current protection device has a first thermal derating ratio ranging from 0.51 to 0.66, wherein the first thermal derating ratio is obtained by dividing a required trip current of the over-current protection device under 23° C. by a required trip current of the over-current protection device under −40° C.

19. The over-current protection device of claim 1, wherein the over-current protection device has a second thermal derating ratio ranging from 0.63 to 0.73, wherein the second thermal derating ratio is obtained by dividing a required trip current of the over-current protection device under 125° C. by a required trip current of the over-current protection device under 85° C.

* * * * *